Patented Oct. 13, 1942

2,298,739

UNITED STATES PATENT OFFICE 2,298,739

ALPHA HALOACRYLONITRILES

Joy G. Lichty, Stow, and James D. D'Ianni, Akron, Ohio, assignors to Wingfoot Corporation, Akron, Ohio, a corporation of Delaware No Drawing. Application March 15, 1940, Serial No. 324,144

15 Claims. (Cl. 260—464)

This invention relates to alpha halogenated acrylonitriles and, particularly, to a method of preparing the same.

The alpha halogenated acrylonitriles do not form by the direct addition of the halogen to acrylonitrile since more than one halogen atom adds on when this procedure is followed. Thus, if bromine be added to acrylonitrile, two bromine atoms will combine with the nitrile molecule to produce alpha, beta-dibromopropionitrile, in accordance with the following equation:

Hence, the problem is to produce the alpha haloacrylonitrile from the dihalo compound by removing only one of the halogen atoms while leaving the other unattacked, the compound losing a molecule of hydrogen halide as a result. It has now been found that one-half of the halogen can be removed very readily by subjecting the dihalo compound to heat under carefully controlled conditions or by treatment with a chemical reagent. In this manner, there is removed from the dihalopropionitrile, hydrogen halide, which, in the case of the chemical dehalogenating agent, forms a compound with such agent. The procedure is indicated by the following equation:

In carrying out the invention, the alpha, beta-dihalopropionitrile, obtained by reaction of the halogen and the acrylonitrile, preferably in the presence of a solvent and at a moderate temperature, say 25° to 50° C., is subjected to heat under carefully controlled conditions to decompose the dihalo compound. The temperature employed may vary from 130°–450° C. and the pressure from that corresponding to 60 mm. of Hg to atmospheric pressure, but best results are obtained at temperatures from 160°–300° C. under a pressure of 60–100 mm. The heating may be carried on in various types of apparatus, for example, in a distilling apparatus or in a heated tube. Prolonged distillation or a number of passes through the heated tube may be required in order to convert a large proportion of the dihalogen compound to the monohalo compound. It may sometimes be necessary to add an inhibitor, such as hydroquinone, and to run the product into a mild neutralizing agent, such as a solution of sodium carbonate, sodium acetate, sodium bicarbonate or ammonia. These precautions are to prevent regeneration of the dihalo propionitrile by reaction of liberated hydrogen halide with the mono halogen compound and also prevent polymerization of the monohalo compound.

The dihalopropionitrile may also be converted to the alpha haloacrylonitrile by appropriate treatment with a dehydrohalogenating agent, such as a tertiary amine. Trimethyl amine, pyridine, picoline and quinoline may be used to treat the dihalogen compound and thus remove hydrogen halide. The tertiary amine is preferably reacted with the dihalo compound under substantially anhydrous conditions.

To illustrate the process, the following example is given: Sixty-four grams of bromine was dissolved in 50 cc. of carbon tetrachloride and this solution was added dropwise, with stirring, in 30 minutes to 27 cc. of vinyl cyanide or acrylonitrile in 50 cc. of carbon tetrachloride. The temperature during the addition was kept in the neighborhood of 25–35° C. Fractionation of the product thus formed yielded 9 grams or 17% of alpha bromoacrylonitrile having a boiling point of 60° C./30 mm. and 53 grams or 62% of alpha, beta-dibromopropionitrile with a boiling point of 120–130° C./30 mm. There was some liberation of HBr. Upon redistillation, further decomposition took place and practically all distilled at 50–60° C./30 mm. In order to purify this product, it was subjected to several more distillations and a final yield of 25 grams or 47% of a product having a boiling point of 113–117° C./730 mm. was secured. This final product, alpha-bromoacrylonitrile, analyzed correctly for Br, and had a refractive index of $n^{28}_D$ 1.4758 and a density of $D^{25}_{25}$ 1.596.

The described method gives satisfactory yields of the alpha haloacrylonitrile, being applicable more especially to the preparation of alpha chloroacrylonitrile and alpha bromoacrylonitrile, the latter being a new compound, so far as known.

While there has been described above a certain preferred embodiment of the invention, it will be apparent that various changes and modifications may be made therein without departing from the spirit of the invention. Accordingly, the invention is to be limited only by the appended claims in which it is intended to set forth all features of patentable novelty residing therein.

What we claim is:

1. A method of preparing alpha haloacrylo nitriles which comprises combining a halogen with acrylonitrile to form alpha, beta, dihalopropionitrile, treating the dihalo compound to remove only one molecule of hydrogen halide leaving an alpha haloacrylonitrile and recovering the alpha haloacrylonitrile.

2. A method of preparing alpha haloacrylonitriles which comprises combining a halogen with acrylonitrile to form alpha, beta, dihalopropionitrile, treating the dihalo compound in the presence of a polymerization inhibitor to remove only one molecule of hydrogen halide leaving an alpha haloacrylonitrile and recovering the alpha haloacrylonitrile.

3. A method of preparing alpha haloacrylonitriles which comprises combining a halogen with acrylonitrile to form alpha, beta, dihalopropionitrile, treating the dihalo compound to remove only one molecule of hydrogen halide leaving an alpha haloacrylonitrile, submerging the reaction products in a neutralizing bath to fix the hydrogen halide and recovering the alpha haloacrylonitrile.

4. A method of preparing alpha chloroacrylonitrile which comprises combining chlorine with acrylonitrile to form alpha, beta, dichloropropionitrile, treating the dichloro compound to remove only one molecule of hydrogen chloride threrefrom leaving alpha chloro acrylonitrile and recovering the alpha chloroacrylonitrile.

5. A method of preparing alpha haloacrylonitriles which comprises combining a halogen from the group consisting of chlorine and bromine with acrylonitrile in an anhydrous medium to form alpha, beta, dihalopropionitrile, treating the dihalo compound to remove only one molecule of hydrogen halide leaving an alpha halo acrylonitrile and recovering the alpha haloacrylonitrile.

6. A method of preparing alpha haloacrylonitriles which comprises combining a halogen with acrylonitrile to form alpha, beta, dihalopropionitrile, subjecting the dihalo compound to heat to remove hydrogen halide therefrom and recovering the alpha haloacrylonitrile.

7. A method of preparing alpha haloacrylonitriles which comprises combining a halogen with acrylonitrile to form alpha, beta, dihalopropionitrile, treating the dihalo compound with a tertiary amine to remove hydrogen halide therefrom and recovering the alpha haloacrylonitrile.

8. A method of preparing alpha-bromoacrylonitrile which comprises combining bromine with acrylonitrile to form alpha, beta-dibromopropionitrile, treating the dibromo compound to remove hydrogen bromide and recovering the alpha-bromoacrylonitrile.

9. A method of preparing alpha bromoacrylonitrile which comprises combining bromine with acrylonitrile to form alpha, beta-dibromopropionitrile, subjecting the dihalo compound to heat to decompose the same and remove hydrogen bromide therefrom and recovering the alpha bromoacrylonitrile.

10. A method of preparing alpha bromoacrylonitrile which comprises combining bromine with acrylonitrile to form alpha, beta-dibromopropionitrile, subjecting the dibromo compound to distillation to remove hydrogen bromide therefrom and recovering the alpha bromoacrylonitrile.

11. A method of preparing alpha bromoacrylonitrile which comprises combining bromine with acrylonitrile to form alpha, beta-dibromopropionitrile, subjecting the dibromo compound to a temperature of about 130° to 450° C. to remove hydrogen bromide therefrom and recovering the alpha bromoacrylonitrile.

12. A method of preparing alpha bromoacrylonitrile which comprises combining bromine with acrylonitrile to form alpha, beta-dibromopropionitrile, subjecting the dibromo compound to a temperature of about 160° to 300° C. to remove hydrogen bromide therefrom and recovering the alpha bromoacrylonitrile.

13. A method of preparing alpha haloacrylonitriles which comprises combining a halogen with acrylonitrile to form alpha, beta, dihalopropionitrile, treating the dihalo compound with a tertiary amine to remove hydrogen halide therefrom and recovering the alpha haloacrylonitrile.

14. A method of preparing alpha halo acrylonitriles which comprises combining a halogen with acrylonitrile to form alpha beta dihalo propionitrile, dehydrohalogenating the dihalo compound to remove only one molecule of hydrogen halide therefrom and recovering the alpha halo acrylonitrile thus formed.

15. A method of preparing alpha bromo acrylonitrile which comprises combining bromine with acrylonitrile to form alpha beta dibromo propionitrile, dehydrobrominating the dibromo compound to remove only one molecule of hydrogen bromide therefrom and recovering the alpha bromo acrylonitrile thus formed.

JOY G. LICHTY.
JAMES D. D'IANNI.